Aug. 11, 1931.     C. I. ERICKSON     1,818,886

PIVOT JOINT

Filed Nov. 26, 1929

INVENTOR.
C. I. Erickson,
BY
Geo. P. Kimmel
ATTORNEY.

Patented Aug. 11, 1931

1,818,886

UNITED STATES PATENT OFFICE

CARL I. ERICKSON, OF GLENDALE, ARIZONA

PIVOT JOINT

Application filed November 26, 1929. Serial No. 409,906.

This invention relates to a pivot joint particularly adapted for use in automobile brake rods but it is to be understood that a joint in accordance with this invention may be used in any capacity for which the same is found to be applicable.

The primary object of the invention is to provide, in a manner as hereinafter set forth, a pivot joint designed to take up wear between the parts thereof, thereby insuring a permanently snug joint entirely free from rattle.

A further object of the invention is to provide a pivot joint having the characteristics above mentioned, in which a pivot pin is formed with a shoulder which is normally maintained in engagement with one of the connected parts by means of a spring carried by the pin.

A further object of the invention is to provide a non-rattling pivot joint as aforesaid which is of extreme simplicity in construction with the parts thereof compactly arranged, and which may be manufactured at a minimum of expense.

With the foregoing and other objects in view, the invention consists of the novel construction, combination and arrangement of parts as hereinafter more particularly described, and illustrated in the accompanying drawings wherein is shown an embodiment of the invention, but it is to be understood that the description and drawings are to be taken as illustrative and that the invention is intended to be limited only by the scope of the claim hereunto appended.

In the accompanying drawings in which like numerals are employed to designate like parts throughout the same:—

Figure 1:
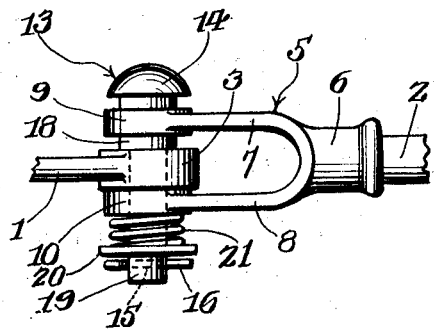
Figure 1 is an elevation of a joint in accordance with this invention.
Figure 2:
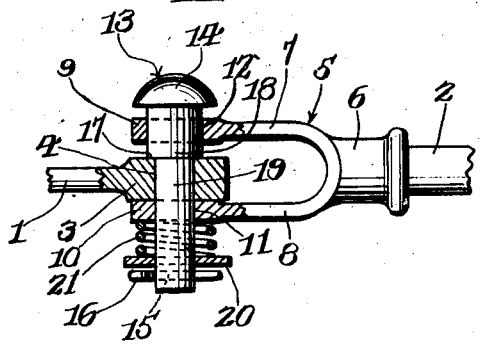
Figure 2 is a vertical section of the embodiment illustrated in Figure 1.

Referring to the drawings in detail, the numerals 1 and 2 respectively designate a pair of rods which it may be desired to connect together in a manner to permit pivotal movement therebetween. The arm 1 is formed with a flat end 3 having an opening 4 extending transversely therethrough. The rod 2 is connected with a yoke 5, preferably by threading one end of the rod into the head 6 of the yoke. The arms 7 and 8 of the yoke are adapted to have the flat end 3 of the rod 1 interposed therebetween and the arms 7 and 8 are formed with flattened ends 9 and 10 respectively. The flattened end 10 is provided with a transverse opening 11 of the same diameter as the opening 4 and the flattened end 9 is formed with a transverse opening 12 of greater diameter than the openings 4 and 11.

The flattened ends 9, 3 and 10 are connected together by means of a pivot pin 13 which is formed at one end with a head 14 and which is provided adjacent its opposite end with a transverse opening 15 for the reception therethrough of a cotter key 16. Spaced from the head 14, the pin 13 is formed with an annular shoulder 17 whereby the shank portion of the pin is provided with portions 18 and 19 of different diameters, the portion 18 being of materially greater diameter than the portion 19.

In the assembled relation of the parts, the portion 18 is extended through the opening 12 and the portion 19 is extended through the openings 4 and 11. A washer 20 encircles the portion 19, inwardly of the cotter key 16, and interposed between the washer 20 and the outer face of the flattened end 10 is a coiled spring 21, the compression of which snugly draws the shoulder 17 into contact with one face of the flattened end 3 whereby the opposite face of the flattened end 3 is maintained in engagement with the inner face of the flattened end 10. Upon the wearing away of the contacting faces of any of the parts, which would normally produce play between such parts, the action of the spring 21 draws the portion 19 of the shank farther through the openings 4 and 11 and the portion 18 of the shank farther through the opening 12 whereby any play between the connected parts is prevented.

It is thought that the many advantages of a non-rattling pivot joint in accordance with this invention will be readily apparent, and although the preferred embodiment of the invention is as illustrated and described, yet it is to be understood that changes in the size, shape and arrangement of parts may be resorted to, so long as such changes fall within the scope of the invention as defined in the appended claim. For example, the flattened end 3 is shown as an integral part of the rod 1, however such flattened end may be detachably connected with the rod if desired.

What I claim is:

In an anti-rattling joint adapted to pivotally connect two elements together, a yoke carried by one of the elements and adapted to have the other element interposed between the arms thereof, the arms of the yoke and the interposed element having aligned openings extending therethrough, the opening through one of the arms being of greater diameter than the openings through the other arm and the interposed element respectively, a pivot pin having a large diameter portion extending through the larger of said openings and projecting from both ends of such larger opening, said pin further having a small diameter portion extending through the other openings, said portions providing an annular flat shoulder at the inner end of the large diameter portion for abutment against one side face of said interposed element, an abutment on said smaller diameter portion, and a spring mounted on the small diameter portion of the pin between said abutment and one of said arms and in connection with said shoulder yieldingly maintaining said interposed element against one of the arms of the yoke.

In testimony whereof, I affix my signature hereto.

CARL I. ERICKSON.